US007808605B2

(12) United States Patent
Hoffmuller et al.

(10) Patent No.: US 7,808,605 B2
(45) Date of Patent: Oct. 5, 2010

(54) SHEETING AND METHODS FOR THE PRODUCTION THEREOF

(75) Inventors: Winfried Hoffmuller, Bad Tolz (DE); Theodor Burchard, Gmund (DE); Thorsten Pillo, Holzkirchen (DE); Manfred Heim, Munich (DE)

(73) Assignee: Giesecke & Devrient GmbH, Munich (DE)

(*) Notice: Subject to any disclaimer, the term of this patent is extended or adjusted under 35 U.S.C. 154(b) by 242 days.

(21) Appl. No.: 11/568,390

(22) PCT Filed: Apr. 29, 2005

(86) PCT No.: PCT/EP2005/004684

§ 371 (c)(1),
(2), (4) Date: Oct. 26, 2006

(87) PCT Pub. No.: WO2005/105475

PCT Pub. Date: Nov. 10, 2005

(65) Prior Publication Data

US 2007/0165182 A1 Jul. 19, 2007

(30) Foreign Application Priority Data

| | | |
|---|---|---|
| Apr. 30, 2004 | (DE) | 10 2004 021 246 |
| Aug. 12, 2004 | (DE) | 10 2004 039 355 |
| Oct. 29, 2004 | (DE) | 10 2004 053 008 |

(51) Int. Cl.
*G02F 1/1335* (2006.01)
*B42D 15/00* (2006.01)

(52) U.S. Cl. ........................... 349/187; 283/85; 283/91; 283/114

(58) Field of Classification Search ................. 349/117, 349/187; 283/75, 85–92, 113, 114
See application file for complete search history.

(56) References Cited

U.S. PATENT DOCUMENTS

| | | | |
|---|---|---|---|
| 6,082,778 | A | 7/2000 | Solmsdorf |
| 6,491,324 | B1 | 12/2002 | Schmitz et al. |
| 6,570,648 | B1 | 5/2003 | Muller-Rees et al. |
| 6,602,578 | B1 | 8/2003 | Tompkin et al. |
| 7,040,663 | B1 | 5/2006 | Plaschka et al. |
| 2003/0031845 | A1 | 2/2003 | Umeya et al. |

(Continued)

FOREIGN PATENT DOCUMENTS

DE 10000592 10/2000

(Continued)

OTHER PUBLICATIONS

International Search Report, International Application No. PCT/EP2005/004667, 6 pages, Dec. 12, 2005.

(Continued)

*Primary Examiner*—Rhonda S Peace
(74) *Attorney, Agent, or Firm*—Greenlee Sullivan P.C.

(57) ABSTRACT

The present invention relates to a foil material for transfer to a target substrate, and methods for manufacturing such a foil material. In a method according to the present invention, a plastic substrate foil (32) is provided that is suitable for aligning liquid crystal material. To the substrate foil (32) is discontiguously applied a layer (34) comprising a liquid crystal material that is aligned.

57 Claims, 9 Drawing Sheets

U.S. PATENT DOCUMENTS

Figure 1:
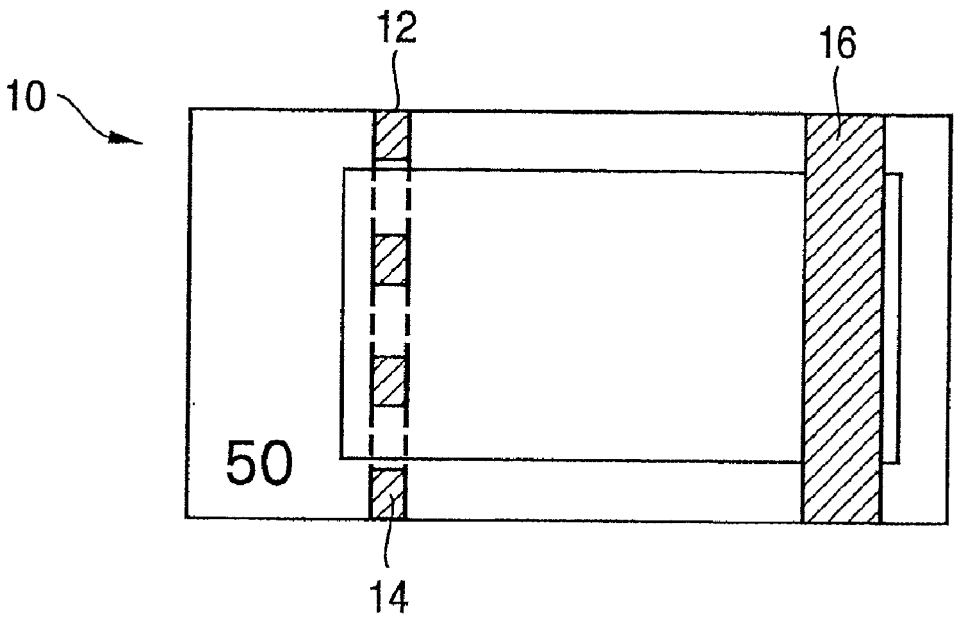

| | | | |
|---|---|---|---|
| 2003/0189684 | A1 | 10/2003 | Kuntz et al. |
| 2004/0241400 | A1 | 12/2004 | Friedl et al. |
| 2007/0165182 | A1 | 7/2007 | Hoffmuller et al. |
| 2007/0211238 | A1 | 9/2007 | Hoffmuller et al. |
| 2007/0216518 | A1 | 9/2007 | Hoffmuller |
| 2007/0229928 | A1 | 10/2007 | Hoffmuller et al. |
| 2007/0241551 | A1 | 10/2007 | Heim |
| 2007/0241553 | A1 | 10/2007 | Heim et al. |
| 2007/0246933 | A1 | 10/2007 | Heim et al. |
| 2007/0274559 | A1 | 11/2007 | Depta et al. |
| 2008/0014378 | A1 | 1/2008 | Hoffmuller et al. |
| 2008/0054621 | A1 | 3/2008 | Burchard et al. |
| 2008/0079257 | A1 | 4/2008 | Fessl |
| 2008/0088859 | A1 | 4/2008 | Depta et al. |
| 2008/0160226 | A1 | 7/2008 | Kaule et al. |
| 2008/0163994 | A1 | 7/2008 | Hoppe et al. |
| 2008/0198468 | A1 | 8/2008 | Kaule et al. |
| 2008/0216976 | A1 | 9/2008 | Ruck et al. |
| 2008/0250954 | A1 | 10/2008 | Depta et al. |
| 2008/0258456 | A1 | 10/2008 | Rahm et al. |

FOREIGN PATENT DOCUMENTS

| | | | |
|---|---|---|---|
| EP | 0435029 | | 7/1991 |
| EP | 0461475 | | 12/1991 |
| EP | 0522217 | | 1/1993 |
| EP | 0678400 | | 3/1995 |
| EP | 0657297 | | 6/1995 |
| EP | 0756945 | | 2/1997 |
| EP | 1120737 | | 8/2001 |
| EP | 1132450 | A2 | 9/2001 |
| EP | 1156934 | B1 | 11/2001 |
| EP | 1327895 | | 7/2003 |
| EP | 1422283 | A1 | 5/2004 |
| GB | 2357061 | | 6/2001 |
| GB | 2398077 | A | 8/2004 |
| WO | WO 99/04983 | | 2/1999 |
| WO | WO 01/055960 | | 8/2001 |
| WO | WO 02/061470 | | 8/2002 |
| WO | WO 02/071345 | | 9/2002 |
| WO | WO 02/085642 | | 10/2002 |
| WO | WO 03/035409 | A1 | 5/2003 |
| WO | WO 03/082598 | | 10/2003 |
| WO | WO 04/032099 | | 4/2004 |
| WO | WO 2005105473 | | 11/2005 |
| WO | WO 2005105474 | | 11/2005 |
| WO | WO 2005105475 | | 11/2005 |
| WO | WO 2005108106 | | 11/2005 |
| WO | WO 2005108108 | | 11/2005 |
| WO | WO 2005108110 | | 11/2005 |
| WO | WO 2006005434 | | 1/2006 |
| WO | WO 2006015733 | | 2/2006 |
| WO | WO 2006018171 | | 2/2006 |
| WO | WO 2006018172 | | 2/2006 |
| WO | WO 2006040069 | | 4/2006 |
| WO | WO 2006056342 | | 6/2006 |
| WO | WO 2006072380 | | 7/2006 |
| WO | WO 2006087138 | | 8/2006 |
| WO | WO 2006099971 | | 9/2006 |
| WO | WO 2006119896 | | 11/2006 |
| WO | WO 2006128607 | | 12/2006 |
| WO | WO 2007006445 | | 1/2007 |
| WO | WO 2007006455 | | 1/2007 |
| WO | WO 2007076952 | | 7/2007 |
| WO | WO 2007079851 | | 7/2007 |
| WO | WO 2007115648 | | 10/2007 |

OTHER PUBLICATIONS

International Preliminary Report on Patentability, International Application No. PCT/EP2005/004667, 14 pages.

International Search Report, International Application No. PCT/EP2005/004684, 4 pages, Sep. 9, 2005.

International Preliminary Report on Patentability, International Application No. PCT/EP2005/004684, 7 pages.

U.S. Appl. No. 11/568,538, filed Sep. 23, 2008, Depta.

U.S. Appl. No. 11/719,843, in pre-exam, Kaule.

U.S. Appl. No. 11/909,115, filed Sep. 19, 2007, Kretschmar.

U.S. Appl. No. 11/995,227, in pre-exam, Gruszczynski.

U.S. Appl. No. 12/097,834, filed Jun. 17, 2008, Kaule.

U.S. Appl. No. 12/294,222, in pre-exam, Hoffmuller.

SHEETING AND METHODS FOR THE PRODUCTION THEREOF

CROSS-REFERENCE TO RELATED APPLICATIONS

This application is the National Stage of International Application No. PCT/EP2005/004684, filed Apr. 29, 2005, which claims the benefit of German Patent Application DE 10 2004 021 246.5, filed Apr. 30, 2004, and claims the benefit of German Patent Application DE 10 2004 039 355.9, filed Aug. 12, 2004, and claims the benefit of German Patent Application DE 10 2004 053 008.4, filed Oct. 29, 2004, all of which are hereby incorporated by reference to the extent not inconsistent with the disclosure herewith.

The present invention relates to a foil material for transfer to a target substrate, as well as methods for manufacturing such a foil material, as well as a security element manufacturable with the foil material. The present invention further relates to a method for transferring a foil material to a target substrate, a method for manufacturing a security element and a method for manufacturing a valuable article, such as a security paper or a value document.

For protection, valuable articles such as branded articles and value documents are often equipped with security elements that permit the authenticity of the valuable article to be verified, and that simultaneously serve as protection against unauthorized reproduction.

Optically variable elements that, at different viewing angles, give the viewer a different image impression, for example a different color impression, are often used as security elements. Holograms, holographic grid images and other hologram-like diffraction patterns that present the viewer a viewing-angle-dependent diffraction pattern are also often used to safeguard authenticity.

Security elements having hologram-like diffraction patterns are transferred, for instance in the transfer method, to the target substrate, for example a banknote. Here, the detachment of the security element from the substrate foil occurs either through so-called separation or release layers, which for the most part are thermally activatible, or through the low adhesion of the security element to the substrate foil. Furthermore, to facilitate a bond to the paper, the security element is coated with a suitable adhesive system. Other security features, such as glossy pigments or other optically variable effect inks, in contrast, are, for the most part, imprinted directly on a paper substrate.

From publication EP 0 435 029 A2 is known a transfer element having a plastic-like layer comprising a liquid crystal polymer, which layer shows a marked play of changing colors at room temperature. The transfer element comprises, in addition to a substrate foil, an optional wax layer, a protective lacquer layer, a layer comprising a liquid crystal polymer, an ink layer and a heat adhesive layer.

Solution-based liquid crystal lacquers require alignment-promoting conditions to be able to exhibit their effect. Special alignment layers are typically used for this purpose. In particular, alignment layers are used that comprise a linear photopolymer that is exposed to a suitable radiation for alignment. Furthermore, liquid crystal materials can also be aligned with the aid of alignment layers that are provided by a finely structured layer or a layer aligned by the application of shear forces. The alignment of the liquid crystal materials on such alignment layers is complex due to the additional work steps normally required for this.

Based on that, the object of the present invention is to specify a foil material and a method for its manufacture that avoids the disadvantages of the background art.

This object is solved by the features of the independent claims. Developments of the present invention are the subject of the dependent claims.

According to the present invention, the liquid crystal material is prepared on a plastic substrate foil. Due to its interior structure, the plastic substrate foil has a preferred direction that is sufficient to align the liquid crystal material in the desired form. In particular, plastic foils that exhibit a surface pattern created upon manufacture are suitable. Examples of such plastic substrate foils that are suitable for aligning liquid crystal material include PET, PE, BOPP and OPP foils, and cellulose triacetate.

The liquid crystal material can thus be applied directly to, preferably imprinted on, the plastic substrate foil, without further alignment layers. According to the present invention, the liquid crystal material is applied discontiguously. Here, the liquid crystal layer is preferably applied in the form of patterns, characters or codes.

In a preferred embodiment, a functional layer is applied contiguously to the liquid crystal layer and, in the exposed areas, correspondingly to the substrate foil. Through the use of a functional layer, also security elements comprising liquid crystal material that are not contiguously present, for example printed as a motif, can be transferred to a target substrate. If desired or necessary, the substrate foil for the liquid crystal layer and the functional layer can be removed upon or following the application of the foil material to the target substrate. To ensure the damageless detachability of the substrate foil of a foil material formed as a transfer material, the adhesion of the functional layer to the substrate foil is advantageously less than to the liquid crystal layer.

Furthermore, in a further preferred embodiment, an adhesive layer is applied for transfer to a target substrate.

In an advantageous development of the present invention, further layers comprising liquid crystal material can be applied discontiguously, especially in the form of patterns, characters or codes, between the discontiguously applied liquid crystal layer and the functional layer. Here, these further layers can advantageously overlap at least in part with the first-applied liquid crystal layer.

The liquid crystal layers are preferably applied, preferably imprinted, as a lacquer layer comprising nematic, cholesteric or smectic liquid crystal material. Here, especially intaglio printing, screen printing, flexo printing, knife coating or curtain coating are appropriate as printing techniques for the liquid crystal layers and/or the functional layer.

As the functional layer, preferably a UV-curing lacquer layer is applied, especially imprinted. The UV-curing lacquer layer expediently includes photoinitiators. In individual cases, especially in manufacturing a transfer material, a trade-off must be sought each time between sufficiently high adhesion of the functional layer to the liquid crystal layer to be detached and sufficiently low adhesion to the substrate foil.

In a further preferred embodiment, a layer comprising cholesteric liquid crystal material is applied, especially imprinted, as the functional layer. Also an embossing lacquer layer can advantageously be used as the functional layer. In this case, the embossing lacquer layer is expediently imprinted and thereafter embossed, provided with a reflective layer, especially a metal layer, and if applicable, demetallized in some areas to introduce, for example, an inverse lettering into the metallized embossing pattern. The embossing pattern advantageously forms an optically effective microstructure, especially a diffraction pattern, a matte pattern, an arrangement comprising microlenses or an arrangement comprising micromirrors.

To achieve better adhesion to subsequently applied layers, for example a subsequently applied embossing lacquer layer, the functional layer can advantageously be subjected to a corona treatment or furnished with an adhesion promoter.

In a further preferred embodiment, one or more further layers can be applied to, especially imprinted on, the functional layer to produce more complex layer structures. Preferably, an embossing lacquer layer can be applied, especially imprinted, as a further layer. Following application, the embossing lacquer layer is advantageously embossed, metallized and, if applicable, demetallized in some areas.

A machine-readable and/or decorative layer that is applied at least in some areas, especially in the form of patterns, characters or codes, can also be used as a further layer. For example, the machine-readable and/or decorative layer can be imprinted with a printing ink on the functional layer or a further layer that has already been applied thereto.

A reflective layer can likewise be applied as a further layer. In all variations having a reflective layer, this layer can also be formed by a reflective thin-film element. Such a thin-film element is preferably formed having a reflection layer, an absorber layer and a dielectric spacing layer disposed between the reflection layer and the absorber layer.

In an advantageous development of the present invention, in addition to the layered composite already described, one or more further layered composites are manufactured and joined together, for example via laminating lacquer layers. In this way, it is possible to realize diverse and complex security layer structures that facilitate a layer sequence that is often not realizable in known multilayer security elements and that enhance the effects of the security element. For the individual layered composites, optimal manufacturing conditions can be chosen in each case due to separate manufacture. In this way, according to the present invention, it is also possible to combine layered composites that require mutually exclusive manufacturing conditions or mutually interfering substrate foils, since the substrate foils can be removed upon or following the joining of the sub-layered composites.

In particular, according to the present invention, a second security layered composite that is present on a second substrate foil can be provided that is joined, via a second adhesive layer, with the layered composite comprising a substrate foil, discontiguous liquid crystal layer and, if applicable, further layers.

In a first variation of the present invention, the second security layered composite is manufactured by applying an embossing lacquer layer to the second substrate foil and embossing, metallizing and, if applicable, demetallizing the embossing lacquer layer in some areas.

According to another variation of the present invention, the second security layered composite is manufactured in that a screened metal layer, especially in the form of patterns, characters or codes, or a semi-transparent metal layer is applied on the second substrate foil, and in that a machine-readable and/or decorative layer, especially in the form of patterns, characters or codes, is manufactured on the metal layer.

The second security layered composite can also comprise a reflective layer. In all variations, the reflective layer can advantageously be formed by a metal layer or, in more complex structures, by a reflective thin-film element having a viewing-angle-dependent color impression. In the latter case, the thin-film element is preferably formed having a reflection layer, an absorber layer and a dielectric spacing layer disposed between the reflection layer and the absorber layer. The reflection layer of the thin-film element is preferably formed from an opaque or semi-transparent metal layer.

The thin-film element can also be formed having at least one absorber layer and at least one dielectric spacing layer, the absorber layers and the dielectric spacing layers being alternatingly stacked. According to a further possible embodiment, the thin-film element is formed having multiple dielectric spacing layers, adjoining layers being formed having strongly different refractive indices.

According to a further variation of the present invention, the second security layered composite comprises an optically effective microstructure that is preferably formed as a diffraction pattern, as a matte pattern, as an arrangement of microlenses or as an arrangement of micromirrors.

In all variants, a layer that includes machine-readable feature substances, especially magnetic, electrically conductive, phosphorescent, fluorescent or other luminescent substances, can be imprinted as a machine-readable and/or decorative layer.

The present invention also includes a foil material for security elements that is manufacturable especially according to one of the above-described manufacturing methods and that includes a security layer sequence having a plastic substrate foil that is suitable for aligning liquid crystal material, and having a first discontiguously present layer comprising liquid crystal material that is present on the plastic substrate foil in aligned form. Furthermore, the first liquid crystal layer of the foil material is advantageously formed from a nematic liquid crystal material. The first liquid crystal layer preferably forms a phase-shifting layer.

In an advantageous development of the present invention, at least one further layer comprising liquid crystal material is present between the discontiguously applied liquid crystal layer and a contiguously present functional layer. The at least one further liquid crystal layer is preferably formed from cholesteric liquid crystal material.

The functional layer preferably comprises a UV-curing lacquer layer. Alternatively, the functional layer can also be formed from a cholesteric liquid crystal material.

In all variations, the foil material can comprise an adhesive layer for transferring the security layer sequence to the target substrate.

The present invention also includes a security element for securing valuable articles, having a discontiguously present layer comprising a liquid crystal material, especially nematic liquid crystal material, and a contiguously present functional layer that is disposed immediately above the discontiguously present layer comprising liquid crystal material. Here, the functional layer is formed by a UV-curing lacquer layer, a layer formed from cholesteric liquid crystal material or an embossing lacquer layer.

The security element preferably comprises a plastic substrate foil that is suitable for aligning liquid crystal material. The functional layer is preferably formed by an embossing lacquer layer in which an optically effective microstructure is embossed and that is provided with a reflective layer, especially a metal layer and, if applicable, demetallized in some areas.

The optically effective microstructure can advantageously be formed by a diffraction pattern, a matte pattern, an arrangement comprising microlenses or an arrangement comprising micromirrors.

The present invention also comprises a method for transferring a foil material to a target substrate, in which a foil material of the kind described is laid with the adhesive layer on the target substrate and joined with the target substrate by heat and/or pressure action. When radiation-curing adhesives are used, the foil material is correspondingly joined with the target substrate by pressure and radiation action. If the foil material is formed as a transfer material, the plastic substrate foil of the liquid crystal layer is expediently removed upon or shortly after the application to the target substrate.

In a method for manufacturing a security element, especially a security thread or a security element to be applied or transferred, a foil material of the kind described is manufactured and furnished with further layers for embedment in or for application to a security paper or a valuable article, especially a value document. Here, the security element preferably includes a carrier substrate comprising paper or plastic.

In a method for manufacturing a valuable article, such as a security paper or a value document, a foil material of the kind described is applied to an article to be secured, especially is affixed by heat and/or pressure action and/or radiation action. Here, advantageously, the surface of the security paper or valuable article can be specially treated to improve the adhesive action of the foil material on the surface, as well as the optical efficiency of the foil material. For this, especially an adhesion promoter can be used that is applied to the surface of the security paper.

Valuable articles within the meaning of the present invention include especially banknotes, stocks, bonds, certificates, vouchers, checks, valuable admission tickets and other papers that are at risk of counterfeiting, such as passports and other identity documents, as well as product protection elements, such as labels, seals, packaging and the like. In the following, the term "valuable article" encompasses all such articles, documents and product protection means. The term "security paper" is understood to be the not-yet-circulatable precursor to a value document, which precursor can exhibit in addition to the security element, further authenticating features, such as luminescent substances provided in the volume. Security paper is customarily present in quasi-endless form and is further processed at a later time.

Further exemplary embodiments and advantages of the present invention are explained below by reference to the drawings, in which a depiction to scale and proportion was omitted in order to improve their clarity.

Figure 2:
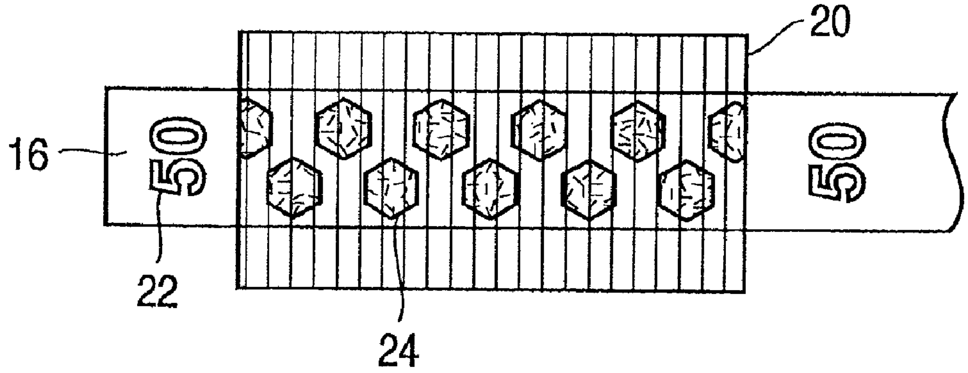
Figure 3:
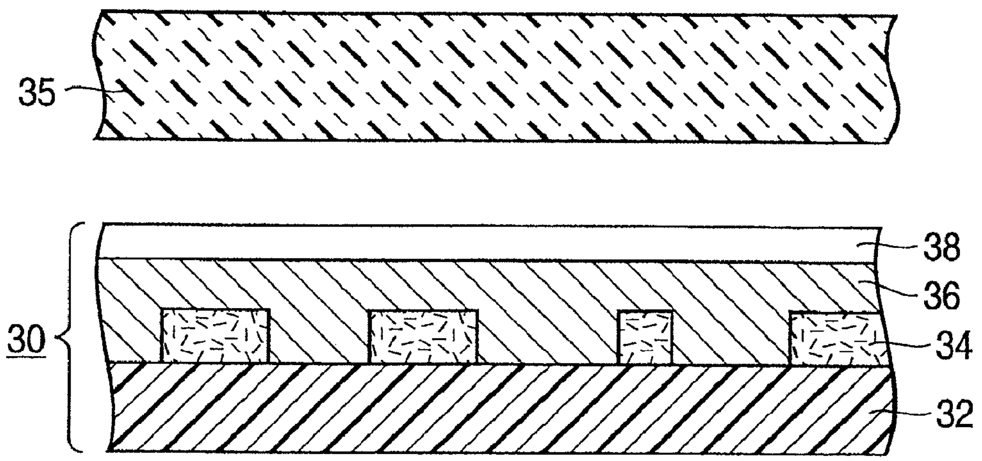
Figure 4:
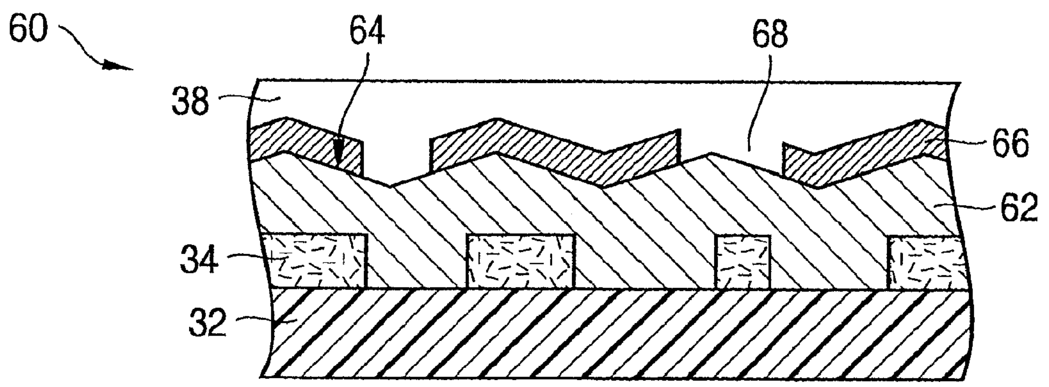
Figure 5A:
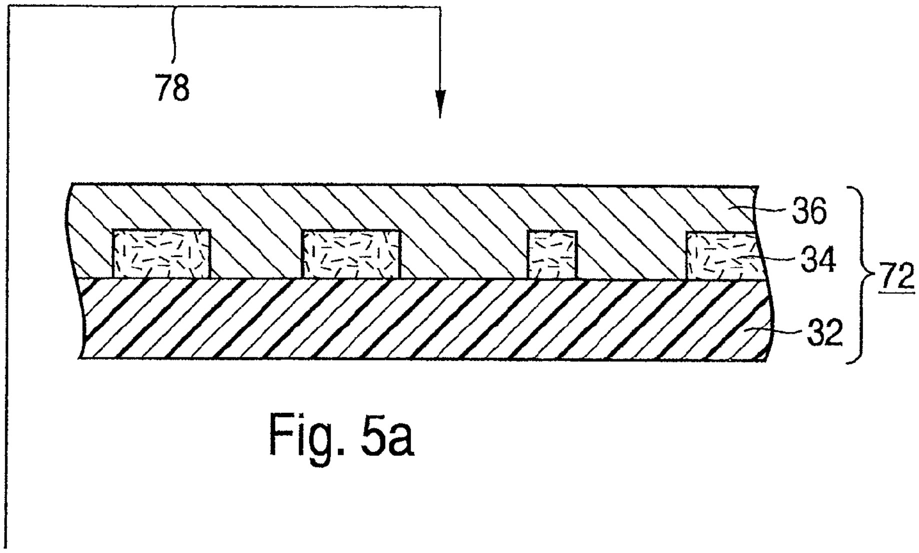
Figure 5B:
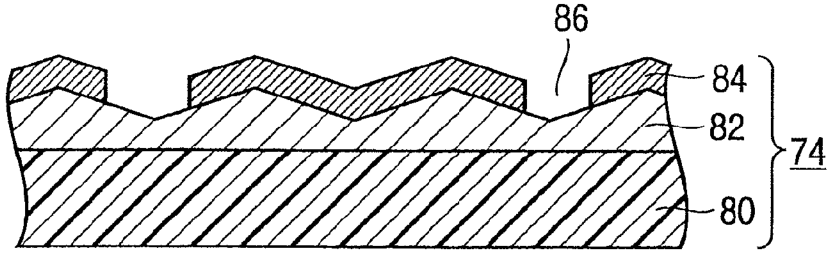
Figure 5C:
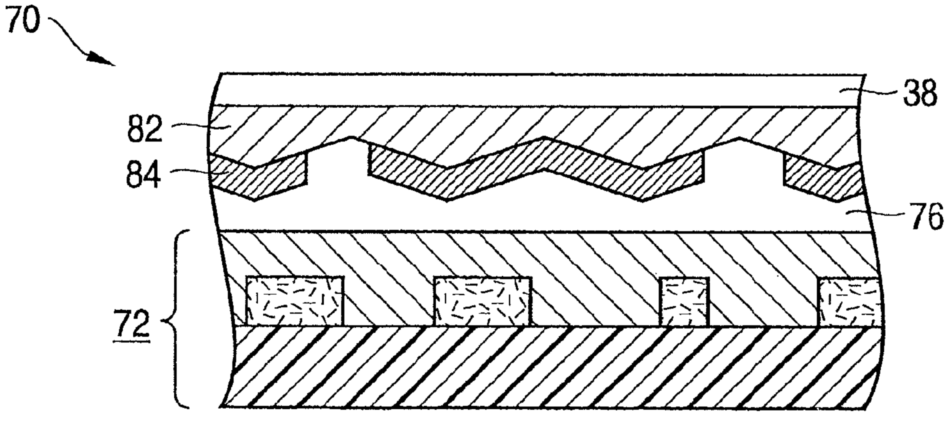
Figure 6:
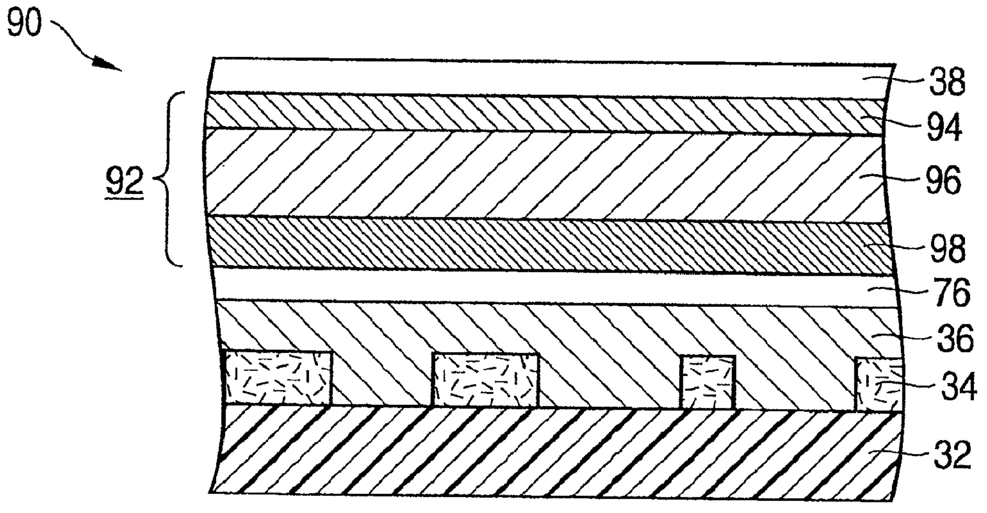
Figure 7:
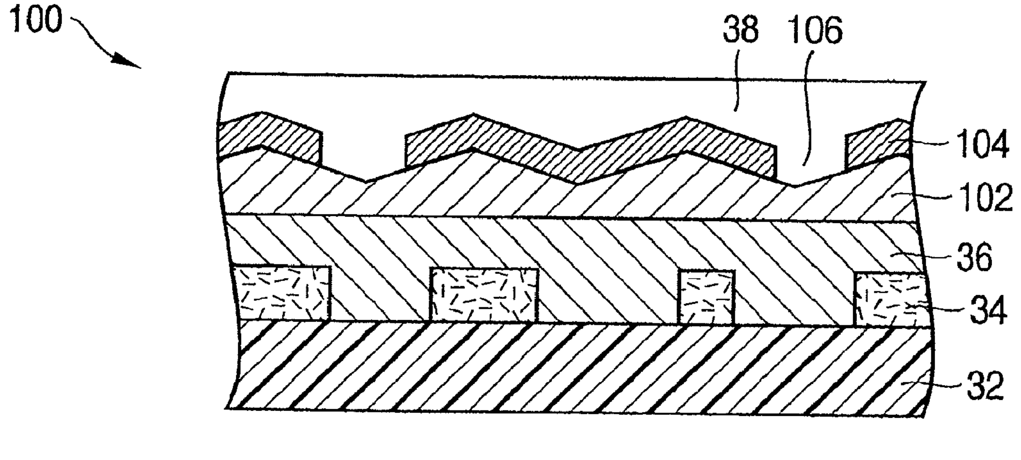
Figure 8A:
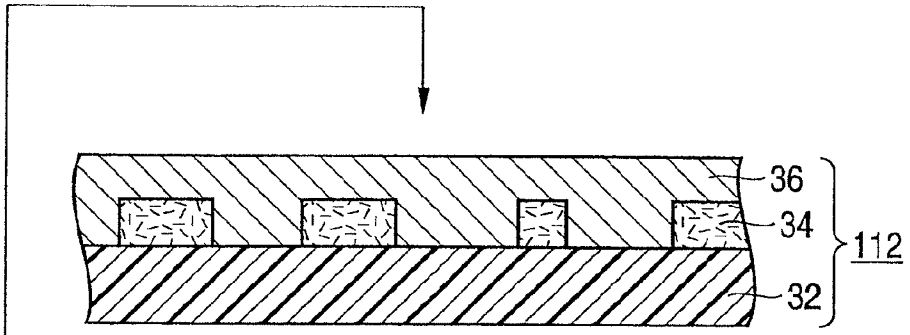
Figure 8B:
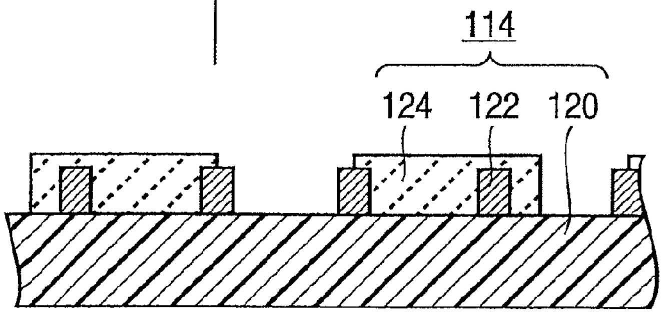
Figure 8C:
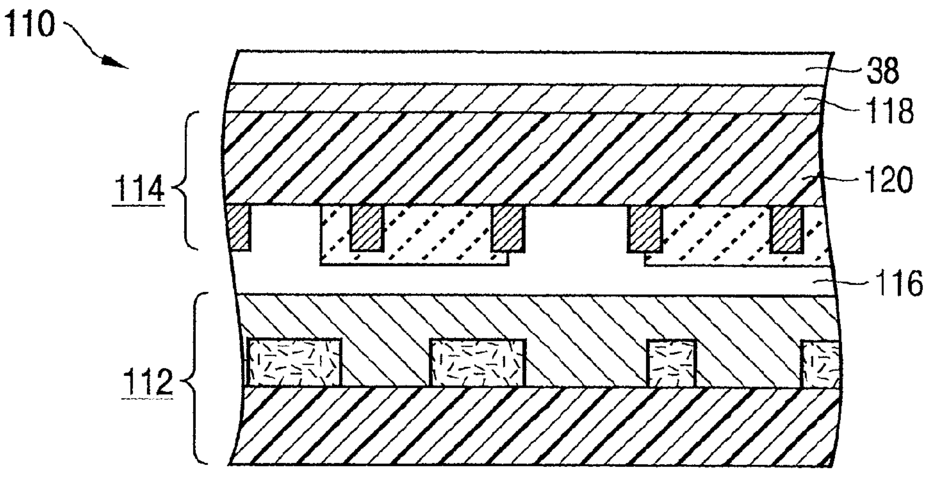
Figure 9:
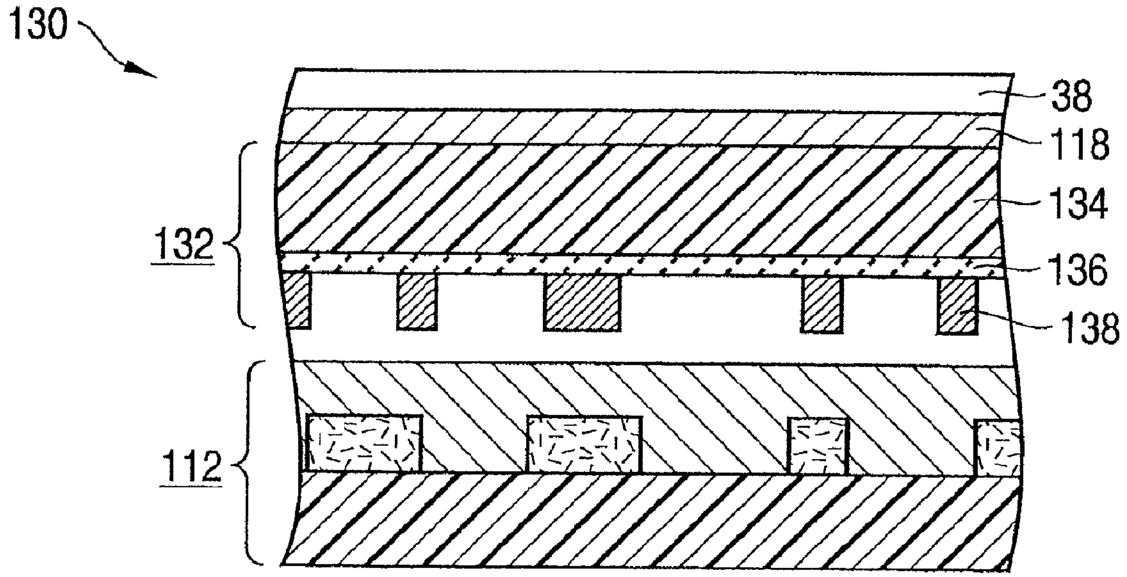
Figure 10A:
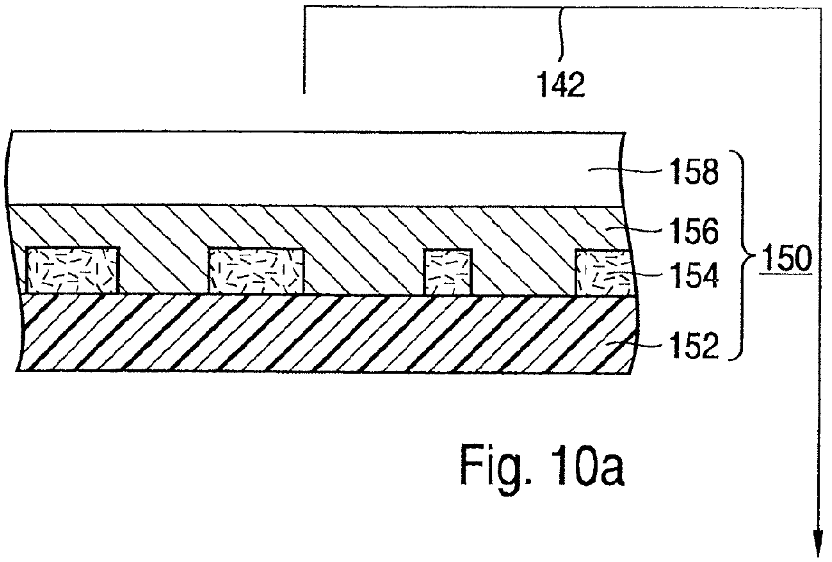
Figure 10B:
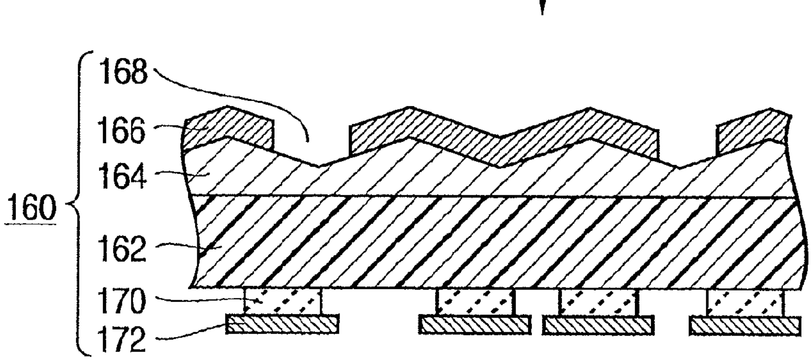
Figure 10C:
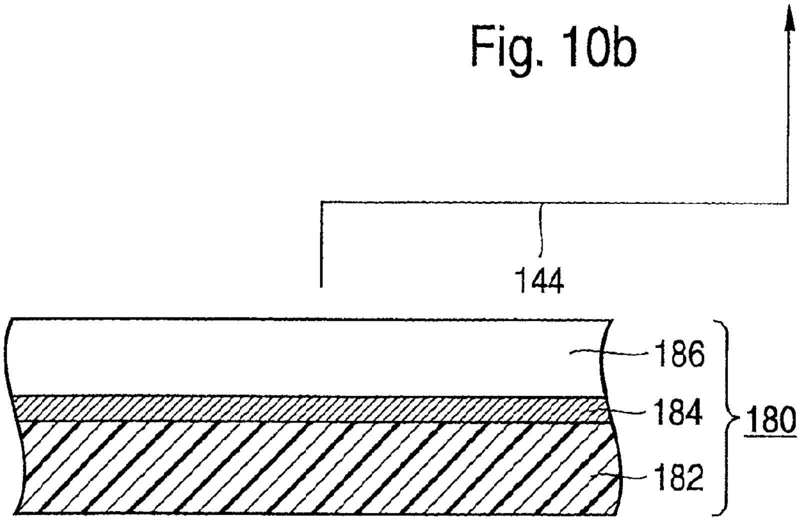
Figure 10D:
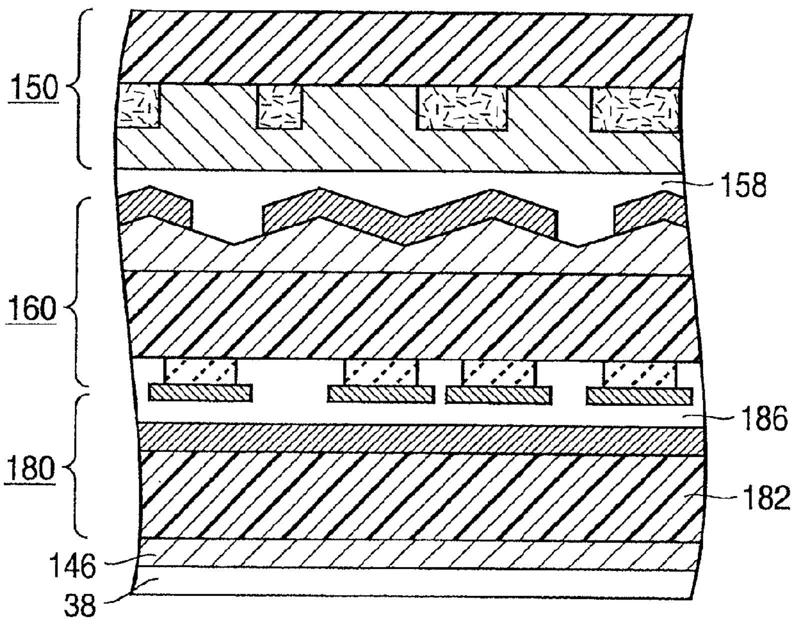
Figure 11:
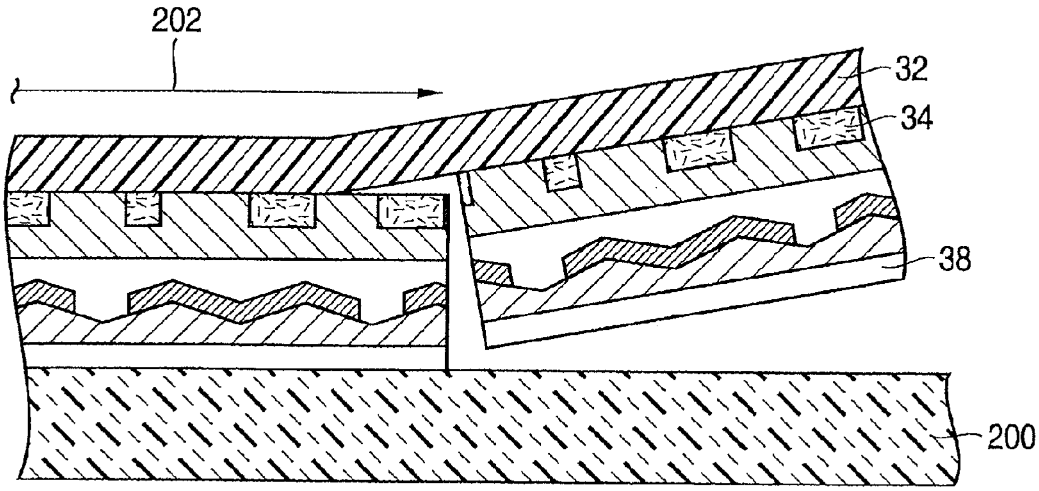
Figure 12:
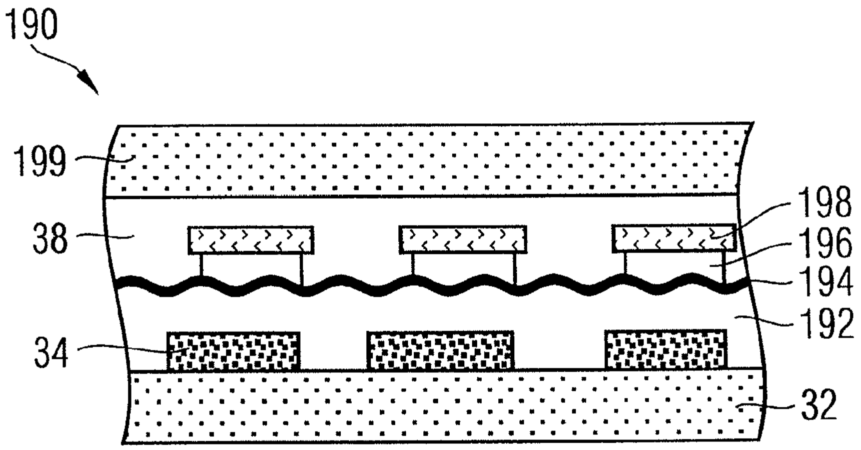
Figure 13A:
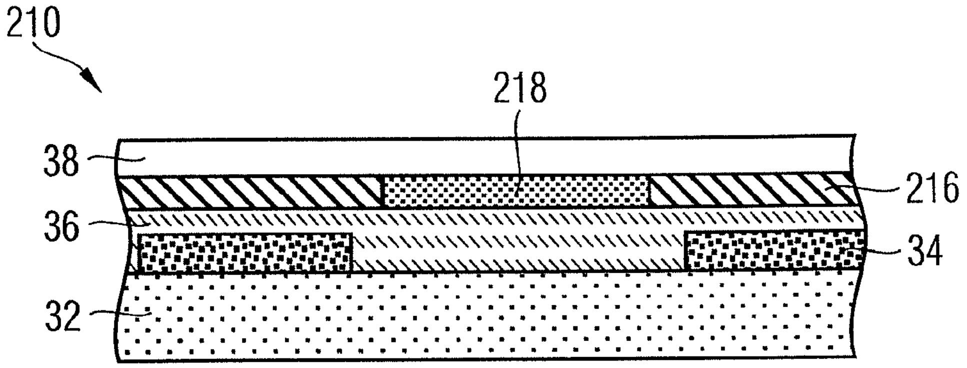
Figure 13B:
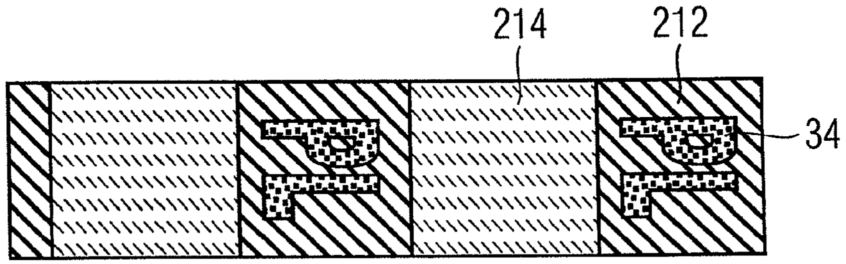

Shown are:

FIG. 1 a schematic diagram of a banknote having an embedded security thread and an affixed security strip, each according to an exemplary embodiment of the present invention, FIG. 2 a top view of a sub-area of the security strip in FIG. 1 as it appears when viewed without auxiliary means or when viewed through a polarizer, FIG. 3 an intermediate step in the manufacture of a foil material according to the present invention, in cross-sectional view FIG. 4 a diagram as in FIG. 3 of a foil material according to a further exemplary embodiment of the present invention, FIG. 5 the manufacture of a foil material according to a further exemplary embodiment of the present invention, wherein (a) and (b) show a first and second layered composite prior to lamination and (c) shows the finished foil material, FIG. 6 a diagram as in FIG. 5(*c*) of a foil material according to a further exemplary embodiment of the present invention, FIG. 7 a diagram as in FIG. 3 of a foil material according to a further exemplary embodiment of the present invention, FIG. 8 the manufacture of a foil material according to a further exemplary embodiment of the present invention, wherein (a) and (b) show a first and second layered composite prior to lamination and (c) shows the finished foil material, FIG. 9 a variation of the exemplary embodiment in FIG. 8(*c*) that differs therefrom only in the formation of the second security layered composite, FIG. 10 the manufacture of a foil material according to a further exemplary embodiment of the present invention, wherein (a), (b) and (c) show a first, second and third layered composite prior to lamination and (d) shows the finished foil material, FIG. 11 the transfer of the foil material in FIG. 5, formed as a transfer material, to a target substrate, FIG. 12 a diagram of a security element according to a further exemplary embodiment of the present invention, and FIG. 13 in (a), a cross-sectional view of a foil material according to a further exemplary embodiment of the present invention, and in (b), a top view of a sub-area of the foil material.

The invention will now be explained in greater detail using a banknote as an example. For this, FIG. 1 shows a schematic diagram of a banknote 10 having two security elements 12 and 16, each of which is manufactured with the aid of a foil material according to the present invention.

The first security element constitutes a security thread 12 that emerges at certain window areas 14 on the surface of the banknote 10, while it is embedded in the interior of the banknote 10 in the areas lying therebetween. The second security element is formed by a wide security strip 16 that is affixed to the banknote paper with a heat seal adhesive.

FIG. 2 shows a top view of a sub-area of the security strip 16 as it appears when viewed without auxiliary means or when viewed through a linear polarizer 20. Viewed without auxiliary means, the security strip 16 displays glossy metallic, optically variable diffraction structures 22, such as holograms or kinegrams. Such diffraction patterns are known to the person skilled in the art and are thus not further explained in the following. Instead of the diffraction patterns 22, e.g. matte patterns or refractive patterns can also be provided.

If the security strip 16 is viewed through a linear polarizer 20, then additional structures appear, in the exemplary embodiment a honeycomb pattern 24. Alternatively, the structures can also be made visible with a circular polarizer. These patterns, which are practically imperceptible with the naked eye, can be used to check the authenticity of the banknote 10.

The structure and the manufacture of security elements according to the present invention will first be explained with reference to simpler and then increasingly more complex security element structures.

FIG. 3 shows, in cross-sectional view, an intermediate step in the manufacture of a foil material 30 that can be used, for example, in a security thread 12 or a security strip 16 of the kind shown in FIG. 1. For this, a layer 34 comprising nematic liquid crystal material is imprinted on a transparent substrate foil 32, for example a smooth plastic foil of good surface quality. The nematic layer 34 is typically imprinted in the form of a motif comprising patterns, characters or a code, for example in the form of the honeycomb pattern shown in FIG. 2. Due to the surface structure of the substrate foil 32 that determines a preferred direction for the alignment of the liquid crystal material, the nematic layer 34 can be imprinted directly on the substrate foil.

On the nematic layer 34 can likewise be imprinted, discontiguously and overlapping with it at least in some areas, a further layer, not shown here, comprising liquid crystal material, e.g. comprising cholesteric liquid crystal material, in the form of a motif.

A functional layer, e.g. a UV-crosslinkable lacquer layer 36, is imprinted contiguously on the nematic layer 34 and the substrate foil 32. Alternatively, a layer comprising cholesteric liquid crystal material or an embossing lacquer layer can also be used as the functional layer 36. To be able, in a later work step, to transfer, removing the substrate foil 32, the nematic layer 34 that is present only in some areas and, if applicable, the further layer comprising cholesteric liquid crystal material, to a target substrate, such as a security paper or a value document, the functional layer is preferably formed such that its adhesion to the substrate foil 32 is less than to the nematic layer 34.

Thereafter is applied to the functional layer 36 an adhesive layer 38 with which the layered composite comprising the substrate foil 32, nematic layer 34 and functional layer 36 can be laminated onto a target substrate, such as a security paper, a value document or also a further thread or strip structure 35. If desired or necessary, the substrate foil 32 for the liquid crystal materials 34 and 36 can, in a last step, be removed again by separation winding. The damageless detachability of the substrate foil 32 is ensured by the greater adhesion of the functional layer 36 to the nematic layer 34.

However, it is also possible to leave the substrate foil 32 in the layered composite following the application to the target substrate or the thread or strip structure. The substrate foil 32 can then serve, for example, as a cover foil.

In all embodiments, both the functional layer and the adhesive layer can include machine-readable feature substances, such as magnetic, electrically conductive, phosphorescent or fluorescent substances.

Prior to the application of the adhesive layer 38, a further layer that is not shown here can be imprinted on the functional layer 36. The further layer can especially be provided with gaps or in the form of patterns, characters or codes. To facilitate good perceptibility of the color and polarization effects of the nematic or, if applicable, cholesteric liquid crystal layers, the layer can be provided by an absorbent imprint or a reflective metal layer. For example, the layer can be manufactured by printing on the functional layer 36 with a commercially available, especially black, printing ink. This is appropriate especially when the functional layer 36 comprises cholesteric liquid crystal material. If the functional layer 36 is present as a UV-crosslinkable lacquer layer, the further layer can be provided by a metal layer into which, through partial demetallization, gaps can be introduced, e.g. in the form of an inverse lettering. A further, e.g. machine-readable, layer can be imprinted under the layer. Machine-readable security features can also be located in the further layer itself. The further manufacturing process then proceeds as already described in connection with FIG. 3.

In the foil material having inverse lettering 60 in FIG. 4, a nematic liquid crystal layer 34 is imprinted on a substrate foil 32. Over the substrate foil 32 and the nematic layer 34 is contiguously imprinted a UV-curing embossing lacquer layer 62 whose adhesion to the substrate foil 32 is less than to the nematic layer 34 such that the embossing lacquer layer 62 fulfills the function of the above-described functional layer when the foil material 60 is transferred to a target substrate.

Thereafter, a desired embossing pattern 64, e.g. a diffraction pattern, is embossed in the embossing lacquer layer 62 and a reflective layer 66, e.g. in the form of a metal layer, applied, especially vapor deposited, into which, through partial demetallization, gaps 68 are introduced, in the exemplary embodiment in the form of an inverse lettering. Alternatively, the embossing pattern 64 can also be provided with a high-index layer. Examples of suitable high-index materials include CaS, $CrO_2$, ZnSi, $TiO_2$ and $SiO_x$. Lastly, for the transfer to the target substrate, an adhesive layer 38 is applied to the layered composite.

Instead of a reflective layer 66 in the form of a metal layer or a high-index layer, the embossing pattern 64 can also be provided with a thin-film element having a color-shift effect, as is described in detail below with reference to FIG. 6.

Prior to application of the adhesive layer 38, further machine-readable and/or decorative layers can be applied to the partially demetallized embossing lacquer layer 62, especially also overlapping with the metal layer 66. For example, a commercially available printing ink can be imprinted that is then perceptible in the gaps or demetallized areas of the embossing lacquer layer when the foil material applied to a substrate is viewed. Furthermore, just like the adhesive layer 38, the printing ink can include machine-readable feature substances, such as magnetic, electrically conductive, phosphorescent or fluorescent substances.

FIG. 5 illustrates the manufacture of a foil material 70 according to a further exemplary embodiment of the present invention. Here, as shown in FIG. 5(*a*), a first layered composite 72 is produced from a first substrate foil 32, a nematic liquid crystal layer 34 and a functional layer 36, as described in connection with FIG. 3. The functional layer 36 can be formed e.g. by a UV-crosslinkable lacquer layer or a layer comprising cholesteric liquid crystal material.

In addition, as shown in FIG. 5(*b*), a second security layered composite 74 is manufactured in that an embossing lacquer layer is imprinted on a second substrate foil 80, a desired embossing pattern, in the exemplary embodiment a diffraction pattern, is embossed in the embossing lacquer, a metal layer 84 is vapor deposited on the embossed layer 82 and, through partial demetallization of the metal layer 84, gaps 86 are produced, for example in the form of an inverse lettering.

The second security layered composite 74 is laminated via an adhesive layer 76 (FIG. 5(*c*)) onto the first layered composite 72, as indicated by the arrow 78 linking FIGS. 5(*b*) and 5(*a*). Thereafter, the second substrate foil 80 is removed by separation winding and, for transfer, an adhesive layer 38 is applied to the layered composite produced in this way, as depicted in FIG. 5(*c*). If the foil material is to be used as a transfer material for transfer to a target substrate, the substrate foil 32 can be removed following the application of the transfer material 70 to the target substrate such that the entire security layered composite is then present without substrate foils. In this way, the features that work with polarization effects are not impaired in their effect by foils and can be viewed with high contrast. If the foil material is to be used as a security thread for embedment in a security paper, the substrate foil 32 can likewise be removed by separation winding and further layers of the thread structure, such as an adhesion promoter and a heat seal coating, can be applied on the then exposed liquid crystal layers 34 and 36.

The reduced protective function for the metallization, caused by the detachment of the second substrate foil 80, can be compensated for by protective lacquer layers. Common protective lacquer layers are optically largely isotropic and thus do not impair the perceptibility of polarizing effects.

If a layer comprising cholesteric liquid crystal material is used as the functional layer 36, an additional, darkly colored layer can be applied, if applicable discontiguously, to the security layered composite 74 to ensure good perceptibility of the color effect of the cholesteric liquid crystal layer. Alternatively, the embossing lacquer layer 82 can also be darkly colored.

Instead of the embossing pattern, the second security layered composite can also include only a metallic reflection layer that is preferably integrated with large demetallization portions in a print motif. Compared with conventional designs, the foil material according to the present invention then exhibits, with the nematic layer 34, an additional check level that can be authenticated with a polarizer.

In all designs having a metallic reflection layer, this layer can also be substituted by a more complex reflection layer structure having particular reflection effects, such as a color-shift effect. For this, FIG. 6 shows an exemplary embodiment whose manufacture proceeds analogously to the manufacturing process described for FIG. 5.

To manufacture the foil material 90, in FIG. 6, that can be used, for example, in a security thread 12 or a security strip 16 of the kind shown in FIG. 1, a first layered composite is produced from a first substrate foil 32, a nematic liquid crystal layer 34 and a functional layer 36, e.g. a UV-crosslinkable lacquer layer, and a second security layered composite from a second substrate foil to which a thin-film element 92 having a color-shift effect is applied.

In the exemplary embodiment, the thin-film element 92 exhibits a reflection layer 94, an absorber layer 98 and a dielectric spacing layer 96 disposed between the reflection layer and the absorber layer. In such thin-film elements, the color-shift effect is based on viewing-angle-dependent interference effects due to multiple reflections in the different sub-layers of the element. The absorber layer 98 and/or the dielectric spacing layer 96 can exhibit gaps in the form of patterns, characters or codes in which no color-shift effect is perceptible. The reflection layer 94, too, can exhibit gaps in the form of patterns, characters or codes that then form transparent or semi-transparent areas in the thin-film element 92.

The sequence of the layers of the thin-film element can also be reversed. Alternatively, the thin-film element can exhibit a layer sequence comprising absorber layer/dielectric layer/absorber layer or a sequence of multiple layers comprising alternating high-index and low-index dielectrics. A layer sequence comprising a reflection layer and an absorbent dielectric layer may also be used.

The second security layered composite produced in this way is then laminated onto the first layered composite via an adhesive layer 76, and the second substrate foil removed by separation winding. For the transfer to the target substrate, an adhesive layer 38 is applied to the now exposed reverse of the thin-film element 92. Prior to the application of the adhesive layer 38, further machine-readable and/or decorative layers, e.g. having a magnetic ink, can be applied to the exposed reverse of the thin-film element 92. Following the transfer, the first substrate foil 32 can also be detached.

In a variation that is not shown of the exemplary embodiment in FIG. 6, a foil material is produced for a two-sided security thread having a liquid-crystal-based color-shift or polarization effect that, for the viewer, is perceptible from the one side, and a thin-film element having a color-shift effect that is perceptible from the second side.

The foil material differs from that shown in FIG. 6 in that the functional layer 36 is formed from cholesteric liquid crystal material. To facilitate especially good perceptibility of the color effect of the cholesteric liquid crystal layer, the adhesive layer 76 forms, in addition, a dark, preferably black background. For this, the adhesive layer 76 can be colored or, if applicable, subsequently blackened by the action of a laser beam. The thin-film element 92 exhibits a reverse sequence to the above described layer sequence, i.e. in the foil material, the reflection layer is present adjoining the adhesive layer 76, and the absorber layer adjoining the adhesive layer 38.

FIG. 7 shows a foil material 100 according to a further exemplary embodiment of the present invention, in which, as in FIG. 3, a nematic liquid crystal layer 34 and a UV-crosslinkable functional layer 36, e.g. comprising cholesteric liquid crystal material, are imprinted on a smooth plastic substrate foil 32 that is suitable for aligning liquid crystal material. Further, on the functional layer 36 is imprinted an embossing lacquer layer, a desired embossing pattern, in the exemplary embodiment a diffraction pattern, embossed in the embossing lacquer layer, and a metal layer 104 vapor deposited on the embossed layer 102. Into the metal layer 104 are introduced, through partial demetallization, gaps 106 in the form of an inverse lettering. Instead of the metal layer 104, a transparent high-index layer that exhibits a refractive index greater than 2 can also be used. In this way, both the diffraction pattern and the liquid crystal layers 34 and 36 are contiguously perceptible on a dark background that is formed by an appropriate additional layer, for example a black imprint, or that can also be present on the target substrate.

To improve the adhesion of the embossing lacquer layer 102 to the functional layer 36, the latter is advantageously previously subjected to a corona treatment or it is furnished with a suitable adhesion promoter. For the application to the target substrate, another adhesive layer 38 is applied to the entire layered composite. Depending on the choice of the relaying layer and the brilliance requirements, the substrate foil 32 can be removed following the application of the foil material 100, or left on the structure.

The manufacture of a foil material 110 for a security thread having a liquid-crystal-based color-shift effect, an inverse lettering and a magnetic code according to a further exemplary embodiment of the present invention will now be explained with reference to FIG. 8.

First, as shown in FIG. 8(*a*), a first layered composite 112 is produced from a first substrate foil 32, a nematic liquid crystal layer 34 and a functional layer 36, e.g. comprising cholesteric liquid crystal material, as described for FIG. 3. A second security layered composite 114 is manufactured in that a screened aluminum layer 122 having gaps in the form of an inverse lettering is applied to a second substrate foil 120, and a magnetic layer 124 is applied, in the exemplary embodiment in the form of a code, to the aluminum layer. This second security layered composite 114 is depicted in FIG. 8(*b*).

In a further embodiment not shown here, the aluminum layer 122 can also be provided as a contiguous layer having gaps, for example in the form of an inverse lettering, to which, in turn, the magnetic layer 124 is applied.

The second security layered composite 114 is then laminated onto the first layered composite 112 via an adhesive layer 116 (FIG. 8(*c*)). Thereafter, further layers 118 that are required for the embedment of the security thread in a security paper, such as a white coating layer, can be applied to the reverse of the second substrate foil 120. Finally, for the transfer to the target substrate, an adhesive layer 38, for example a heat seal coating, is applied. The substrate foil 32 can be removed by separation winding and further layers of the thread structure, such as an adhesion promoter and a heat seal coating, can be applied to the then exposed liquid crystal layers 34 and 36.

In a variation that is not shown of the exemplary embodiment in FIG. 8, instead of the magnetic layer 124 applied in the form of a code, also a dark, especially black, layer having gaps and, in some areas, a magnetic layer, for example in the form of magnetic bits, can be used. In particular, not all black areas must at the same time also be magnetic. In this way, it is possible to optically conceal a magnetic code in the black layer.

A further variation of the exemplary embodiment in FIG. 8 that differs only in the formation of the second security layered composite is depicted in FIG. 9. The second security layered composite 132 of the foil material 130 in FIG. 9 includes, instead of the screened aluminum layer, a contiguous, semi-transparent metal layer 136 that is applied to a substrate foil 134 and on which a magnetic layer 138 is disposed, for example in the form of a code. The further procedure in the manufacture of the security thread 130 follows the description given above in connection with FIG. 8.

FIG. 10 illustrates the manufacture of a foil material 140 for a hologram security thread having a magnetic code and nematic print according to a further exemplary embodiment of the present invention.

First, a first layered composite 150 is manufactured from a first plastic substrate foil 152, a nematic liquid crystal layer 154, a functional layer 156 comprising a modified UV-curing lacquer, and a first adhesive layer 158, as shown in FIG. 10(*a*).

To manufacture a second security layered composite 160, which is depicted in FIG. 10(*b*), an embossing lacquer layer is imprinted on a second plastic substrate foil 162, a desired diffraction pattern is embossed in the embossing lacquer, and on the embossed layer 164 is vapor deposited a metal layer 166, e.g. an aluminum layer, in which, as already described in connection with FIG. 5, gaps 168 are produced, for example in the form of an inverse lettering, through partial demetallization. A magnetic layer 170 is applied in the form of a code to the reverse, which is not coated with embossing lacquer, of the substrate foil 162. The magnetic bits of the magnetic code are then covered with a coating layer 172.

A third layered composite 180 that acts as a cover element in the finished security thread is produced by applying a contiguous metal layer 184 to a third, particularly thin plastic substrate foil 182 and providing the metal layer 184 with a further contiguous adhesive layer 186, as shown in FIG. 10(*c*).

Now, the first layered composite 150 with the nematic print is laminated with the aid of the adhesive layer 158 onto the top of the hologram layered composite 160 (arrow 142), and the cover layered composite 180 is laminated via the adhesive layer 186 to the magnetic-code-bearing underside of the hologram layered composite 160 (arrow 144). Further layers 146, such as a white coating layer, that are required for the embedment of the security thread in a security paper can then be applied to the reverse of the third substrate foil 182. Finally, for the transfer to the target substrate, an adhesive layer 38, for example a heat seal coating, is applied, as depicted in FIG. 10(*d*). The substrate foil 152 of the first layered composite 150 can then be removed by separation winding and further layers of the thread structure, such as an adhesion promoter and a heat seal coating, can be applied to the then exposed liquid crystal layers 154 and 156.

The application of the described security elements to a target substrate 200, e.g. a security paper or a plastic foil, is explained with reference to FIG. 11 by way of example based on the foil material present as the transfer material 70 in FIG. 5. For this, the transfer material 70 is laid with the heat seal adhesive layer 38 on the target substrate 200 and pressed on. The pressing can occur, for example, with a heated transfer stamp or a transfer roller, which are not depicted. Under pressure and heat action, the adhesive layer 38 bonds with the target substrate 200 in the desired areas 202 such that a transfer element is created, if applicable having a predetermined outline shape. The substrate foil 32 of the liquid crystal layers 34, 36 can be removed in the application process or also shortly thereafter. Prior to the application of the transfer material 70 to the target substrate 200, the surface of the target substrate 200 can be specially treated. In this way, it is possible to improve especially the adhesive effect of the transfer material and the optical efficiency of the security features it provides. For example, an adhesion promoter can be applied to the surface of the transfer material.

FIG. 12 shows a security element 190 according to a further exemplary embodiment of the present invention, in which, as in FIG. 4, a nematic liquid crystal layer 34 and, contiguously thereover, as a functional layer, a UV-curing embossing layer 192 are imprinted on a smooth plastic substrate foil 32, e.g. a PET foil, that is suitable for aligning liquid crystal material. On the diffraction pattern embossed in the embossing lacquer layer 192 is vapor deposited a metal layer 194 into which, if applicable, gaps can be introduced through partial demetallization.

Prior to the application of the adhesive layer 38, further layers, in the exemplary embodiment a machine-readable layer 196 that includes machine-readable feature substances, such as magnetic, electrically conductive, phosphorescent or fluorescent substances, as well as a white coating layer 198 that is required for the embedment of the security thread in a security paper, are applied discontiguously, e.g. in the form of a motif.

Thereafter, the layered composite comprising plastic substrate foil 32, nematic liquid crystal layer 34, metallized embossing lacquer layer 192, 194, machine-readable layer 196 and coating layer 198 is laminated by means of the adhesive layer 38 onto a target substrate 199, such as a PET foil.

If desired or necessary, the plastic substrate foil 32 can be removed again by separation winding. In this case, it is to be ensured that the adhesion of the functional layer 192 to the substrate foil 32 is less than to the nematic layer 34.

However, it is also possible to leave the substrate foil 32 in the layered composite. Such an embodiment is appropriate especially when the security element is present in the form of a security strip in a window, manufactured with papermaking technology or diecut, of a banknote. The substrate foil 32 then also serves, for instance, as a cover foil.

FIG. 13(*a*) shows, in cross-sectional view, a foil material 210 according to a further exemplary embodiment of the present invention, in which, as in FIG. 3, a nematic liquid crystal layer 34 and a functional layer 36 comprising cholesteric liquid crystal material, are imprinted on a smooth, transparent plastic substrate foil 32. The nematic layer 34 is typically imprinted in the form of a motif comprising patterns, characters or a code, for example in the form of the letter string "PL" shown in FIG. 13(*b*).

To facilitate good perceptibility of the polarization effects of the nematic liquid crystal layer, as is described in connection with FIG. 3, a reflective metal layer 216 is applied over the nematic layer 34 in the areas 212 prior to the application of the adhesive layer 38. Furthermore, in the metal-layer-free areas 214, an absorbent imprint is imprinted with a commercially available, especially black, printing ink. This provides a dark background layer 218 that is essential for the perceptibility of the color-shift effects of the cholesteric liquid crystal layer.

Thereafter, the adhesive layer 38 is applied with which the layered composite comprising the substrate foil 32, nematic layer 34, functional layer 36, metal layer 216 and dark background layer 218 can be laminated onto a target substrate, such as a security paper, a value document or also a further thread or strip structure. If desired or necessary, the substrate foil 32 for the liquid crystal materials 34 and 36 can, in a last step, be removed again by separation winding. Here, the damageless detachability of the substrate foil 32 is ensured by the greater adhesion of the functional layer 36 to the nematic layer 34.

In a variation that is not shown of the exemplary embodiment in FIG. 13, the nematic layer 34 can also be present in the area 214, for example likewise in the form of a motif. When the foil material that is applied to a target substrate is viewed with the naked eye, then only the color-shift effects of the cholesteric liquid crystal layer 36 are perceptible. If, however, the foil material is viewed through a linear polarizer, the structures formed by the nematic layer 34 appear.

The invention claimed is:

1. A method for manufacturing a foil material for security elements, having the method steps:

a) providing a plastic substrate foil that is suitable for aligning liquid crystal material, and b) discontiguously applying a first layer comprising a liquid crystal material directly to the substrate foil without further alignment layers, the liquid crystal material being aligned, wherein in step a) the substrate foil exhibits a surface pattern created upon manufacture and wherein the substrate foil has an interior structure which has a preferred direction that is sufficient to align the liquid crystal material.

2. The method according to claim 1, characterized in that a functional layer is applied contiguously to the first liquid crystal layer and the substrate foil, and wherein adhesion of the functional layer to the substrate foil is less than to the liquid crystal layer.

3. The method according to claim 2, characterized in that at least one further liquid crystal layer is applied discontiguously between the discontiguously applied first liquid crystal layer and the functional layer.

4. The method according to claim 2, characterized in that a UV-curing lacquer layer is applied as the functional layer.

5. The method according to claim 2, characterized in that a layer comprising cholesteric liquid crystal material is applied as the functional layer.

6. The method according to claim 2, characterized in that an embossing lacquer layer that is subsequently embossed is applied as the functional layer.

7. The method according to claim 6, characterized in that the embossing lacquer layer is metallized.

8. The method according to claim 2, characterized in that the functional layer is corona treated or furnished with an adhesion promoter.

9. The method according to claim 2, characterized in that one or more further layers are applied to the functional layer.

10. The method according to claim 9, characterized in that, as a further layer, an embossing lacquer layer is applied that is subsequently embossed and metallized.

11. The method according to claim 9, characterized in that, as a further layer, a machine-readable and/or decorative layer is applied at least in some areas.

12. The method according to claim 11, characterized in that the machine-readable and/or decorative layer is imprinted in the form of patterns, characters or codes.

13. The method according to claim 9, characterized in that a reflective layer is applied as the one or more further layers.

14. The method according to claim 13, characterized in that the reflective layer is formed by a metal layer.

15. The method according to claim 13, characterized in that the reflective layer is formed by a reflective thin-film element having a viewing-angle-dependent color impression.

16. The method according to claim 15, characterized in that the thin-film element is formed having a reflection layer, an absorber layer and a dielectric spacing layer disposed between the reflection layer and the absorber layer.

17. The method according to claim 1, characterized in that an adhesive layer is applied for transferring the layered composite formed to a target substrate.

18. The method according to claim 1, characterized in that the foil material is formed as an application material.

19. The method according to claim 1, characterized in that the foil material is formed as a transfer material.

20. The method according to claim 1, characterized in that the first liquid crystal layer is applied in the form of patterns, characters or codes.

21. The method according to claim 1, characterized in that the first liquid crystal layer is applied as a lacquer layer comprising nematic, cholesteric or smectic liquid crystal material.

22. The method according to claim 1, characterized in that the first liquid crystal layer is applied by means of intaglio printing, screen printing, flexo printing, knife coating or curtain coating.

23. The method according to claim 1, characterized in that the substrate foil forms a first layered composite with the liquid crystal material, and a second security layered composite is provided that is present on a second substrate foil and that is joined with first layered composite via an adhesive layer.

24. The method according to claim 23, characterized in that the second security layered composite is manufactured by applying an embossing lacquer layer to the second substrate foil and embossing and metallizing.

25. The method according to claim 23, characterized in that the second security layered composite is manufactured by applying a screened metal layer, especially in the form of patterns, characters or codes, or a semi-transparent metal layer to the second substrate foil and by subsequently applying at least a machine-readable and/or decorative layer to the metal layer.

26. The method according to claim 23, characterized in that the second security layered composite comprises a reflective layer.

27. The method according to claim 26, characterized in that the reflective layer is formed by a metal layer.

28. The method according to claim 26, characterized in that the reflective layer is formed by a reflective thin-film element having a viewing-angle-dependent color impression.

29. The method according to claim 23, characterized in that the second security layered composite comprises an optically effective microstructure.

30. The method according to claim 29, characterized in that the optically effective microstructure is formed as a diffraction pattern, as a matte pattern, as an arrangement of microlenses or as an arrangement of micromirrors.

31. The method according to claim 1, characterized in that, as a machine-readable and/or decorative layer, a layer is imprinted that includes machine-readable feature substances.

32. A method for transferring a foil material to a target substrate, in which a foil material according to claim 1 is laid with the adhesive layer on the target substrate and joined with the target substrate by heat and/or pressure and/or radiation action.

33. The method according to claim 32, characterized in that the plastic substrate foil is removed upon or after the application to the target substrate.

34. A method for manufacturing a security element in which a foil material is manufactured according to claim 1 and is furnished with further layers for embedment in or for application to a security paper or a valuable article.

35. The method according to claim 34, characterized in that the security element includes a carrier substrate comprising paper or plastic.

36. A method for manufacturing a valuable article in which a foil material according to claim 1 is applied to an article to be secured, especially is affixed by heat and/or pressure and/or radiation action.

37. The method according to claim 1, wherein as the substrate foil a PET foil, PE foil, BOPP foil, OPP foil, or a cellulose triacetate foil is provided.

38. A foil material for security elements having:

a plastic substrate foil that is suitable for aligning liquid crystal material;

and having a discontiguously present first layer comprising a liquid crystal material that is present in aligned form, wherein the first layer is disposed directly to the substrate foil without further alignment layers, and wherein the substrate foil exhibits a surface pattern created upon manufacture, and wherein the substrate foil has an interior structure which has a preferred direction that is sufficient to align the liquid crystal material.

39. The foil material according to claim 38, characterized in that a contiguously present functional layer is disposed above the discontiguously present first liquid crystal layer and the substrate foil.

40. The foil material according to claim 39, characterized in that at least one further liquid crystal layer is applied discontiguously between the discontiguously applied first liquid crystal layer and the functional layer.

41. The foil material according to claim 39, characterized in that the functional layer is formed from a UV-curing lacquer layer or a cholesteric liquid crystal material.

42. A security element for securing valuable articles, manufactured using the foil material of claim 41, the security element having:

a discontiguously present layer comprising a liquid crystal material; and a contiguously present functional layer that is disposed directly over the discontiguously present layer comprising liquid crystal material, the functional layer being formed by a UV-curing lacquer layer, a layer comprising cholesteric liquid crystal material or an embossing lacquer layer.

43. The security element according to claim 42, characterized in that the security element further comprises a plastic substrate foil that is suitable for aligning liquid crystal material and which, due to its interior structure, has a preferred direction that is sufficient to align the liquid crystal material.

44. The security element according to claim 43, characterized in that the functional layer is formed by an embossing lacquer layer, and is embossed and metallized.

45. The security element according to claim 42, characterized in that the functional layer is formed by an embossing lacquer layer, and is embossed and metallized.

46. The foil material according to claim 39, characterized in that the functional layer is formed by an embossing lacquer layer that is embossed.

47. The foil material according to claim 46, characterized in that the embossing lacquer layer is metallized.

48. A security element for securing valuable articles, manufactured using the foil material of claim 46, the security element having:

a discontiguously present layer comprising a liquid crystal material; and a contiguously present functional layer that is disposed directly over the discontiguously present layer comprising liquid crystal material, the functional layer being formed by a UV-curing lacquer layer, a layer comprising cholesteric liquid crystal material or an embossing lacquer layer.

49. The foil material according to claim 39, characterized in that the adhesion of the functional layer to the substrate foil is less than to the liquid crystal layer.

50. The foil material according to claim 39, characterized in that one or more further layers are applied to the functional layer.

51. The foil material according to claim 50, characterized in that a machine-readable and/or decorative and/or reflective layer is applied as a further layer.

52. The foil material according to claim 51, characterized in that, as a machine-readable and/or decorative layer, a layer is imprinted that includes machine-readable feature substances.

53. The foil material according to claim 38, characterized in that the first liquid crystal layer is formed from a nematic liquid crystal material.

54. The foil material according to claim 38, characterized in that the first liquid crystal layer forms a phase-shifting layer.

55. The foil material according to claim 38, characterized in that the at least one further liquid crystal layer is formed from cholesteric liquid crystal material.

56. The foil material according to claim 38, characterized in that the foil material comprises an adhesive layer for transferring the security layer sequence to a target substrate.

57. The foil material according to claim 38, wherein the substrate foil is a PET foil, PE foil, BOPP foil, OPP foil, or a cellulose triacetate foil.

* * * * *